G. L. PHELPS.
CORN HUSKER AND SHREDDER.
APPLICATION FILED JUNE 29, 1912.

1,226,365.

Patented May 15, 1917.
4 SHEETS—SHEET 1.

Witnesses:
F. W. Hoffmeister.
C. C. Palmer.

Inventor.
George L. Phelps.
By E. W. Burgess
Attorney.

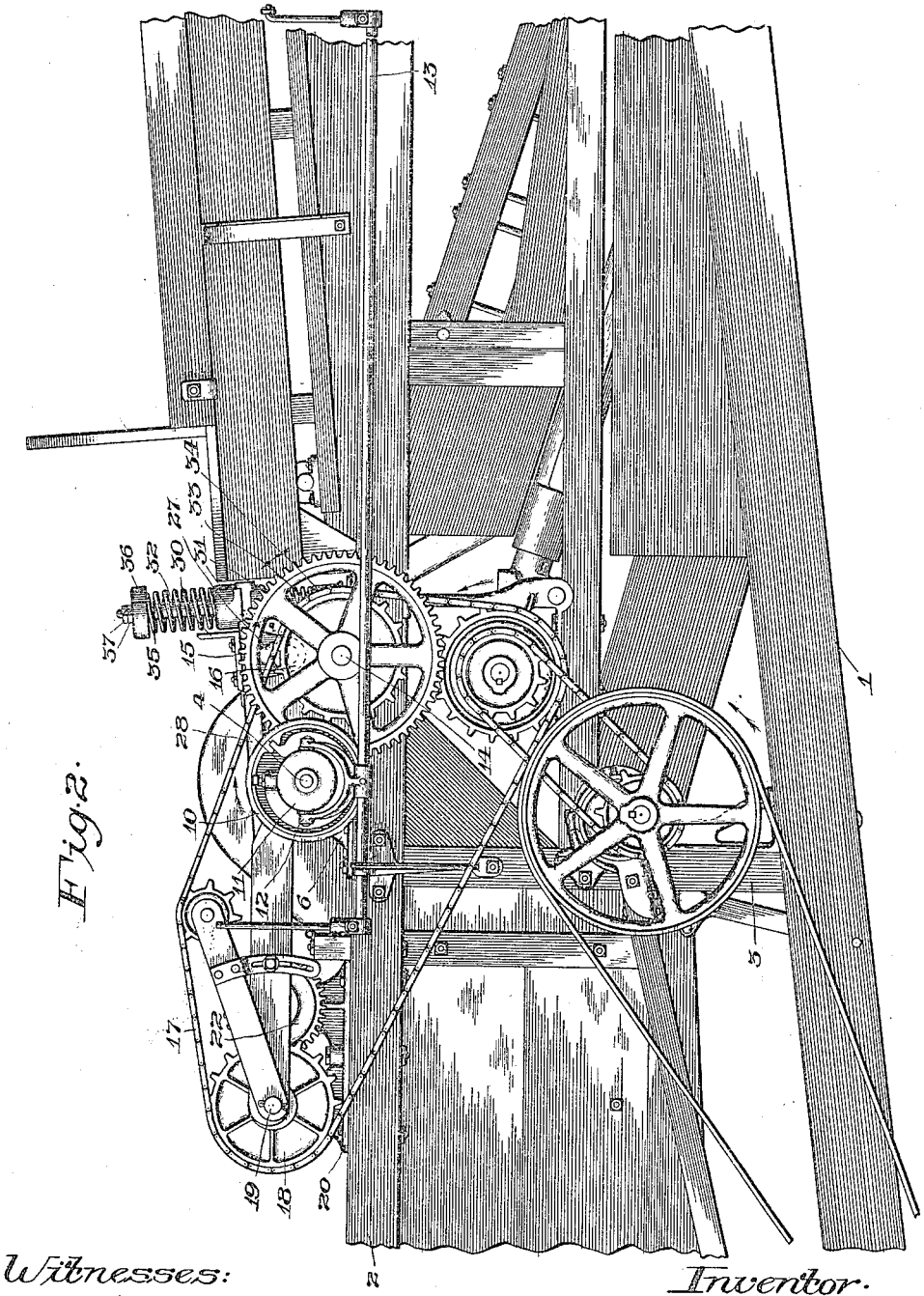

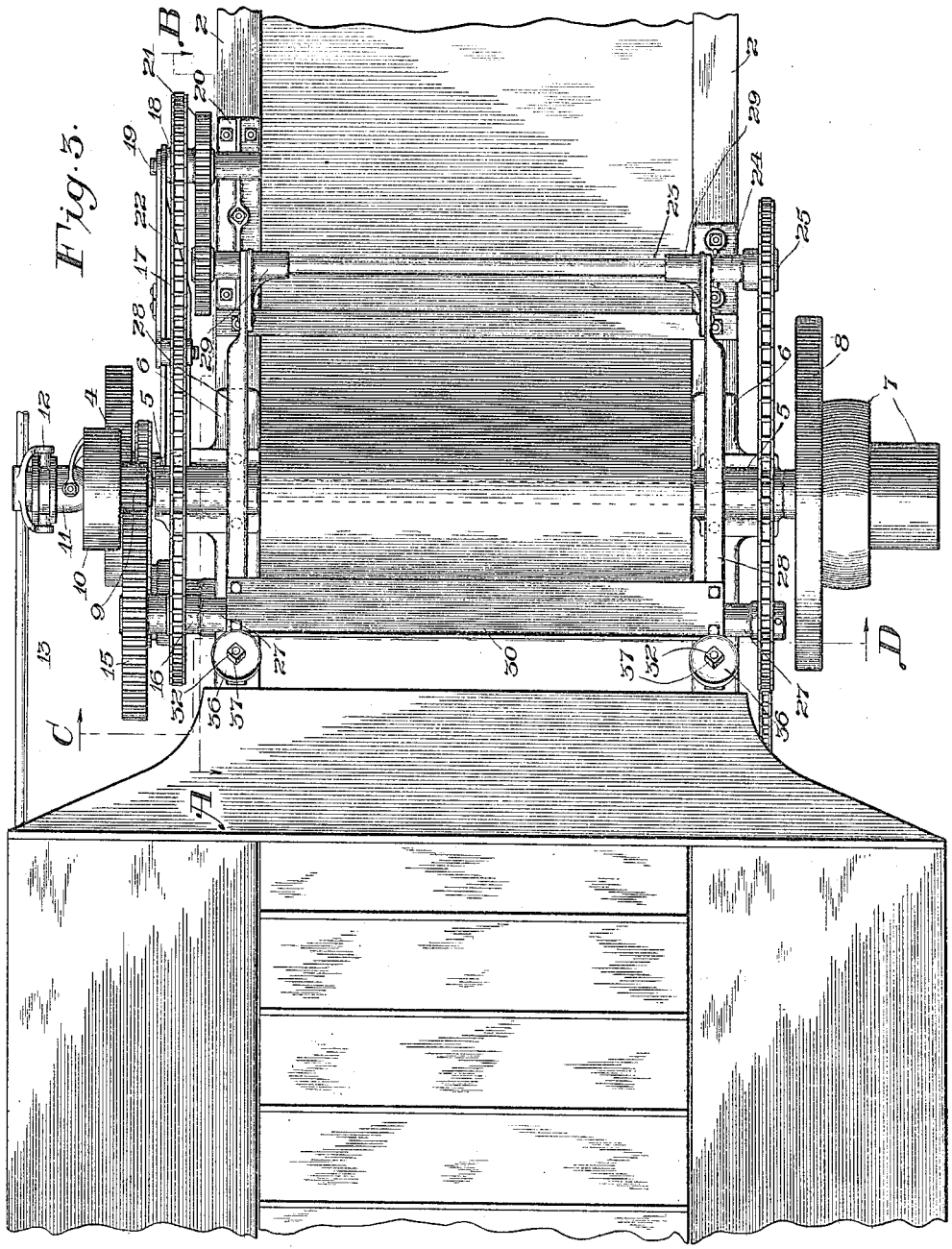

G. L. PHELPS.
CORN HUSKER AND SHREDDER.
APPLICATION FILED JUNE 29, 1912.
1,226,365.
Patented May 15, 1917.
4 SHEETS—SHEET 4.
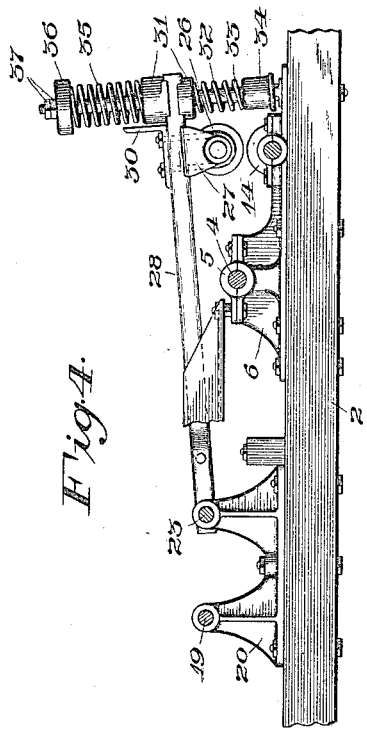
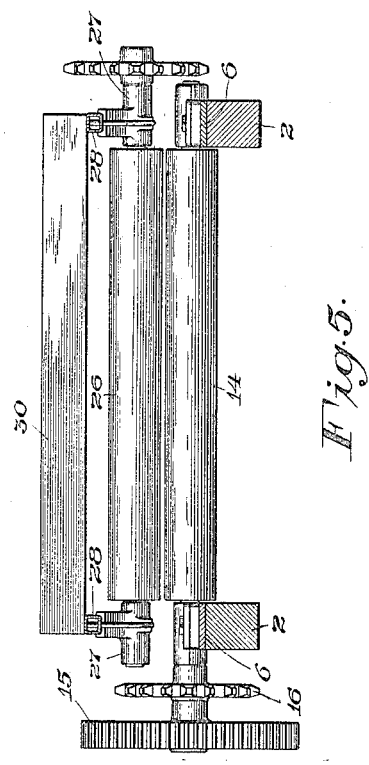
Witnesses:
F. W. Hoffmeister
C. C. Palmer
Inventor:
George L. Phelps
By E. W. Burgess
Attorney

UNITED STATES PATENT OFFICE.

GEORGE L. PHELPS, OF CHICAGO, ILLINOIS, ASSIGNOR TO INTERNATIONAL HARVESTER COMPANY OF NEW JERSEY, A CORPORATION OF NEW JERSEY.

CORN HUSKER AND SHREDDER.

1,226,365.  Specification of Letters Patent.  Patented May 15, 1917.

Application filed June 29, 1912. Serial No. 706,632.

*To all whom it may concern:*

Be it known that I, GEORGE L. PHELPS, a citizen of the United States, residing at Chicago, in the county of Cook and State of Illinois, have invented certain new and useful Improvements in Corn Huskers and Shredders, of which the following is a specification.

My invention relates to corn huskers and shredders, and in particular to the manner of transmitting motion from the power shaft to the coacting snapping rollers, and consists in means whereby the rollers are driven in opposite directions and in a positive manner regardless of the distance between the axes thereof; the object of my invention being to provide a construction that will prove to be efficient in operation, and one that will eliminate excessive friction and consequent wearing of parts. I attain these objects by means of the mechanism illustrated by the accompanying drawings, in which—

Fig. 2 is a side elevation of the machine as seen from the opposite side;

Fig. 3 is a top plan view of part of Fig. 1;

Fig. 4 is a detached side elevation, partly in section, of parts of the snapping roller mechanism along line A—B of Fig. 3; and Fig. 5 is a front view of the snapping rollers along line C—D of Fig. 3.

The same reference characters designate like parts throughout the several views.

Figure 1:
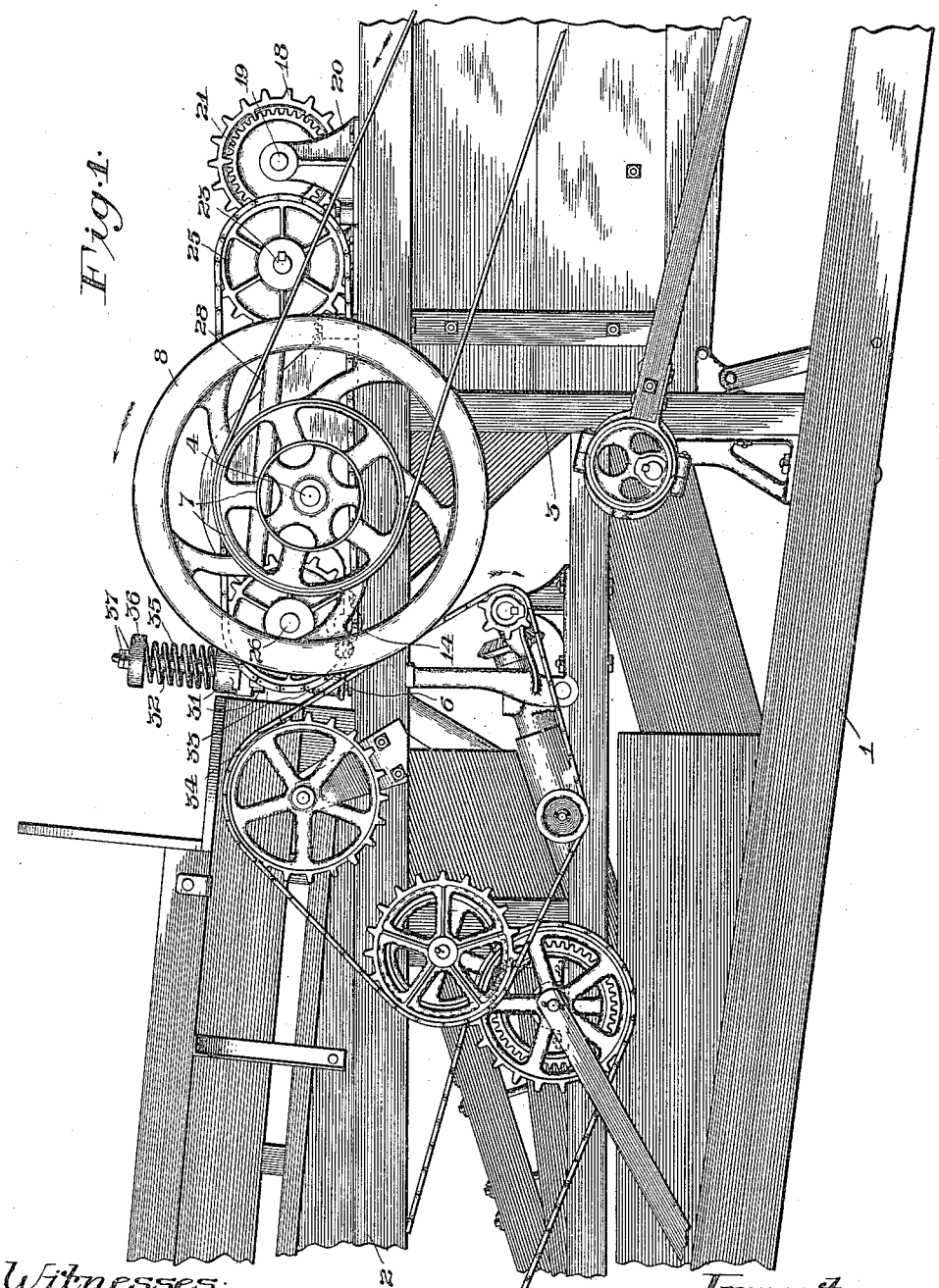
Figure 1 represents a side elevation of part of a corn husker and shredder having one form of my invention embodied in its construction.

The frame of the machine includes base sill members 1, upon opposite sides thereof, and top rails 2 connected with the base members by means of vertical members 3. 4 represents a primary power shaft which may carry a shredding cylinder of any suitable construction. This shaft is journaled in bearings 5, forming part of a bracket member 6 fixed to top rails 2, and carries on one end of the same a pair of driving pulleys 7 and the fly wheel 8. Upon the opposite end of this shaft 4 pinion 9 is loosely mounted and forms part of a loose clutch member 10 that is operatively connected with a fixed clutch member 11 slidably mounted upon the shaft and controlled by a shipping fork 12 carried by a longitudinally arranged rock shaft 13. 14 represents the lower snapping roller journaled in bearings forming part of the bracket member 6 and having secured thereto a gear wheel 15 that engages with the pinion 9, and a sprocket wheel 16 that is connected, by means of a sprocket chain 17, with a sprocket wheel 18 journaled upon a shaft 19 carried by a bracket member 20 secured to one of the top rails 2 in rear of the snapping rollers and shredding mechanism, and journaled upon the same shaft and rotating with sprocket wheel 18 is a gear wheel 21 that engages with a gear wheel 22 secured to the end of a transversely arranged countershaft 23 journaled in a bearing forming part of the bracket member 20, the opposite end of the shaft being journaled in a bearing 24 secured to the top rail of the frame upon the opposite side of the machine and having secured thereto a sprocket wheel 25. 26 represents the upper snapping roller mounted in bearings 27 secured to the front side of a carrying frame including side members 28 having the rear ends thereof secured to bearing boxes 29 that are journaled upon the countershaft 23, and 30 represents a transversely arranged bar secured to the front ends of side frame members 28. The side frame members 28 extend forward of the bearing boxes 29, and 31 represents short barrel members mounted thereon. 32 represents tension rods having the lower ends thereof pivotally connected with the top rails 2 of the frame structure, and their body portions slidably received by the barrel members, and 33 represents buffer springs interposed between thimbles 34 carried by the tension rods and the lower ends of the barrels, and operative to prevent the coacting snapping rollers from engaging with each other in an injurious manner when released from the heavy feeding of stalks, the upper roller being yieldingly held toward the lower by means of compression springs 35 surrounding the upper portion of the tension rods and operative between the upper ends of the barrel members 31 and washers 36, the pressure of the springs being regulated by means of adjusting nuts 37 threaded upon the upper ends of the tension rods 32 above the washers 36.

My improved means for transmitting motion to the upper snapping roller permits a wide separation of the rollers in order that a heavy mass of stalks may pass between them without in any manner changing the efficiency of the driving mechanism, and by placing buffer springs in position to receive the rebound of the upper roller, it does not come in violent contact with the lower roller in the absence of stalks.

What I claim as being my invention, and desire to secure by Letters Patent, is:

1. In a corn handling machine, a frame, a snapping roll journaled thereon, a supplemental frame pivoted on said frame at one side of the axis of said roll, a coöperating roll journaled in said supplemental frame, resilient means intermediate said frame and said supplemental frame, and resilient means normally holding said first mentioned resilient means under compression.

2. In a corn handling machine, a frame, a snapping roll journaled thereon, a supplemental frame disposed in a plane above said roll and pivoted at one side of the axis thereof, a coöperating roll carried on said supplemental frame, and resilient means acting in opposition to each other on opposite sides of said supplemental frame positioning said movable roll in a predetermined position with respect to said first mentioned roll.

3. In a corn handling machine, a frame, a snapping roll journaled thereon, a standard carried on said frame, a supplemental frame pivoted thereon and protruding over said roll, a member pivoted on said main frame and protruding upward therefrom adjacent the end of said supplemental frame, a coöperating snapping roll carried on said supplemental frame, and resilient means carried on said pivoted member exerting opposite pressures upon opposite sides of said supplemental frame.

4. In a corn handling machine, a frame, a snapping roll journaled thereon, a supplemental frame disposed in a plane above said roll pivoted to said main frame at a point at one side of the axis of said roll, a coöperating roll carried on the movable end of said supplemental roll, an upstanding member pivoted on said frame adjacent said supplemental frame, a spring on said upstanding member intermediate said supplemental frame and said main frame, and a second spring on said member intermediate said supplemental frame and the free end of said member.

5. A corn husking machine including, in combination, a machine frame, a pair of coacting snapping rollers, one of said rollers being journaled in fixed bearings carried by said frame, the opposing roller being journaled in bearings movable toward or from the axis of the companion roller, pressure springs operative to yieldingly press the movable roller toward the fixed roller, and buffer springs operative in a manner to cushion the return movement of the movable roller toward the axis of the fixed roller.

6. A corn husking machine including, in combination, a machine frame, a stationary snapping roller journaled in bearings secured to said frame, means for transmitting motion to said roller, a countershaft journaled in bearings carried by said frame, a roller carrying frame journaled upon said countershaft in a manner permitting said frame to turn about the axis thereof, a coacting snapping roller journaled in said frame, compression springs operative to move said carrying frame toward the axis of said stationary roller, buffer springs operative to cushion the return movement of said carrying frame toward the axis of said stationary roller, driving connections between said countershaft and said stationary roller, and other driving connections between said countershaft and said movable roller whereby said rollers are rotated in opposite directions.

7. A corn husking machine including, in combination, a machine frame, a stationary snapping roller journaled in bearings secured to said frame, a countershaft journaled in bearings carried by said frame, a roller carrying frame journaled upon said countershaft in a manner permitting said shaft to turn about the axis thereof, bearing boxes secured to the opposite ends of said side members, a coacting snapping roller journaled in said bearing boxes, barrel members carried by said side members adjacent said bearing boxes, tension rods having the lower ends thereof pivotally connected with said machine frame and the body portions thereof slidably received by said barrel members, buffer springs surrounding said rods and interposed between said machine frame and the lower ends of said barrel members, compression springs surrounding said rods and having the lower ends received by the upper ends of said barrel members, adjusting nuts carried by the upper ends of said tension rods and engaging with said compression springs, and means for rotating said rollers.

GEORGE L. PHELPS.

Witnesses:
 WILLIAM CLARK,
 EDWARD J. TEUFEL.

Copies of this patent may be obtained for five cents each, by addressing the "Commissioner of Patents, Washington, D. C."